United States Patent [19]
Tiegel

[11] 3,984,255
[45] Oct. 5, 1976

[54] METHOD AND APPARATUS FOR FORMING BATTERY PLATES

[75] Inventor: Ernest George Tiegel, Belmont, Calif.

[73] Assignee: Tiegel Manufacturing Company, Belmont, Calif.

[22] Filed: Mar. 25, 1974

[21] Appl. No.: 454,317

[52] U.S. Cl. ............................ 204/2.1; 204/297 R
[51] Int. Cl.² ........................................ H01M 35/30
[58] Field of Search ..................... 136/76, 78–81, 136/33–34, 134, 171–173; 204/267, 286–288, 297 R; 211/41 C

[56] References Cited
UNITED STATES PATENTS

| | | | |
|---|---|---|---|
| 439,240 | 10/1890 | Gibson | 136/34 |
| 2,560,836 | 7/1951 | Zachlin | 136/34 |
| 2,590,703 | 3/1952 | Homan | 136/34 |
| 2,911,457 | 11/1959 | Sabatino et al. | 136/33 |
| 3,014,594 | 12/1961 | Kerstner | 211/41 C |
| 3,553,021 | 1/1971 | Eberle | 204/287 |
| 3,754,994 | 8/1973 | Roach | 136/34 |

*Primary Examiner*—Anthony Skapars
*Attorney, Agent, or Firm*—Schapp and Hatch

[57] ABSTRACT

A method and apparatus is provided for treating plate panels or plates for electric storage batteries, the apparatus providing special movable racks for transporting a plurality of plate panels through the entire process of formation, preserving, washing, treating and drying. The racks provide spaced vertical slots for accommodating the battery plates in such manner that the weight of the plates rests on a pair of spaced contact bars extending longitudinally along the bottom of the rack in position to support the battery plates and provide electric contact during the charging operation. The contact bars are formed either with inerted V-shaped ridges or inclined surfaces to permit the weight of the plates to make a firm connection between the plate lugs and the contact bars. In one form of the invention, the contact bars are mounted in the formation tank, while in another form of the invention the contact bars are incorporated into the rack. The formation tank is formed with barriers of non-conductive, acid-resistant material for blocking any current leakage path between the contact bars and preventing shorting.

12 Claims, 10 Drawing Figures

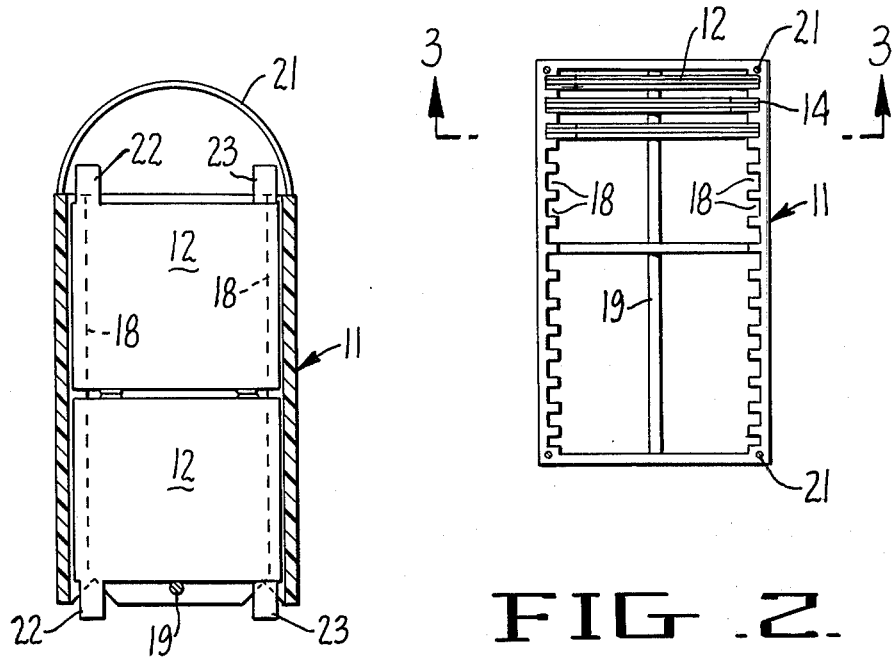
FIG. 2.
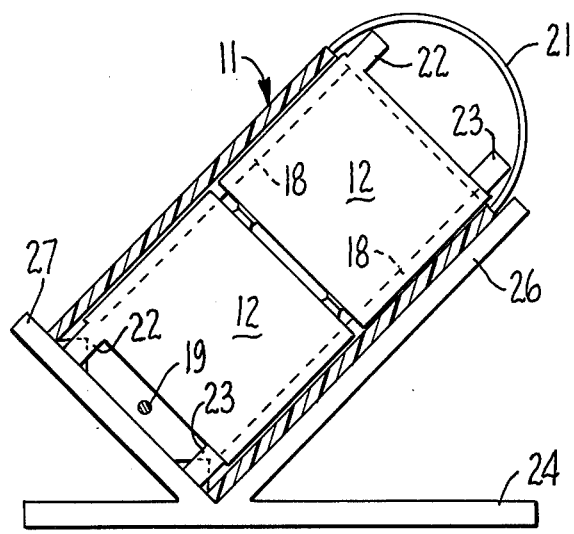
FIG. 3.
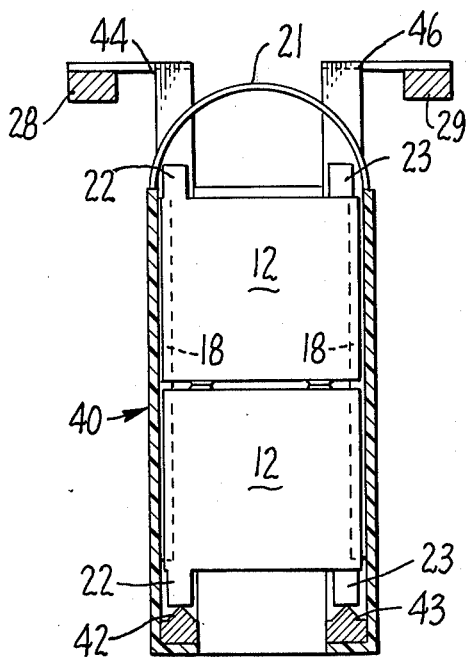
FIG. 4.
FIG. 5.

METHOD AND APPARATUS FOR FORMING BATTERY PLATES

BACKGROUND OF THE INVENTION

The present invention relates to a METHOD AND APPARATUS FOR FORMING BATTERY PLATES, and more particularly to a system for facilitating the formation, washing, treating, preserving and drying operations on the plates.

Conventional battery plate formation apparatus already known includes electrolyte containing formation tanks equipped with fixed racks adapted to support the plate panels. The positive and negative plate panels are inserted one at a time into the formation tank racks. The tanks are then filled with electrolyte, and the plate panels are connected to a source of electrical energy to form and charge the plates. The plates are then removed one at a time, sorted, washed, dried in steam or in a neutral atmosphere, and/or otherwise treated to preserve them, and then are assembled into batteries.

In such presently used systems a large amount of work has to be done in the formation room under very unpleasant conditions, including a lot of stooping work. Since the work has to be done over a large floor area, it is very difficult to provide each formation tank with sufficient exhaust to protect the work from contact with undesirable materials. Also, the formation tanks in at least some sections of the formation room are undergoing charging to the battery plates, and the worker will necessarily be exposed to electrolyte fumes for a considerable period of time. The positive and negative plate panels have to be placed individually into the formation tank rack under the described deleterious conditions. After the formation treatment is completed, adverse working conditions are again encountered as the formed and charged panels are withdrawn one at a time from the formation tank, are separated according to polarity, and are placed on other racks to be washed and dried.

SUMMARY OF THE INVENTION

The present invention provides a system for efficiently handling large numbers of battery plates through the various steps of the plate treatments and minimizes hazardous and unhealthful working conditions. To accomplish this, the present invention contemplates loading the uncharged battery plates into a portable battery plate formation rack which supports and conveys the plates during the entire process. This provides a number of advantages. The racks can be filled and unloaded outside of the formation room, at a convenient work station well ventilated and well organized so the work proceeds efficiently in a safe atmosphere. The filled racks are loaded onto a conveyor or cart to move the racks to the various locations in the formation room. The racks are safely and easily transferred into the formation tanks and the positive and negative plate lugs automatically make firm electrical contact with contact bars adapted to supply the electrical energy necessary for charging the plates.

After a "line" (a number of formation tanks with the contact bars connected in series) has been filled with loaded racks, the tanks are filled with electrolyte (sulfuric acid, sodium hydroxide, etc.) and then the line is put on charge. After some time the plates are properly formed, the electrolyte is discharged from the formation tank for recycling, and a number of loaded racks are placed on a pallet or a wheeled cart called a "basket" for movement to the treating areas. This movement of plates undergoing treatment is made efficiently and safely in large numbers without repetitive individual handling of plates.

The portable plate formation racks of the present invention are formed with a number of spaced vertical slots into which the opposite edges of successive battery plates of opposite polarity are inserted. In one of the invention, a nonconductive rod is mounted to extend longitudinally along the bottom of the rack for supporting the battery plates. When the rack is lowered into the formation tank, the depending plate lugs come to rest upon parallel metal contact bars mounted in the tank, with the weight of the plates pressing down the contact lugs into intimate electrical contact with the contact bars.

In another form of the invention, the contact bars are incorporated into the rack structure and the plates are supported thereon on their plate lugs at all times throughout the process. Preferably, the formation tank is provided with shields of non-conductive material for preventing a current leakage path between the contact bars to avoid short circuits. In either version the contact bars are formed to cooperate with the weight of the plates in providing good electrical contact.

A principal object of the present invention is to provide a system for safe and efficient handling of storage battery plates through the various operations of formation, washing, treating and/or drying.

Another object of the present invention is to provide a system of the character described in which repetitive handling of the individual plate panels between each of such operations is eliminated.

A further object of the invention is to provide an apparatus for safe and efficient handling of battery plates in which a number of the individual plates or plate panels are supported in a transportable rack for movement through the various steps of the formation and other treatments.

A still further object of the present invention is to provide, in apparatus of the character described, effective electrical contact between the battery plates and the electric current supply bars.

Other objects, advantages and novel features of the present invention will become apparent from the following detailed description of the invention when considered in conjunction with the accompanying drawings.

BRIEF DESCRIPTION OF THE DRAWINGS:

FIG. 2 is a plan view of a rack structure forming part of the apparatus of the present invention.

FIG. 3 is a vertical cross-sectional view taken substantially on the plane 3—3 of FIG. 2.

FIG. 4 is a view similar to that of FIG. 3, but illustrating the rack mounted on a loading stand.

FIG. 5 is a vertical cross-sectional view taken similarly to that of FIG. 3, but illustrating a modified form of the rack of the present invention.

Figure 1:
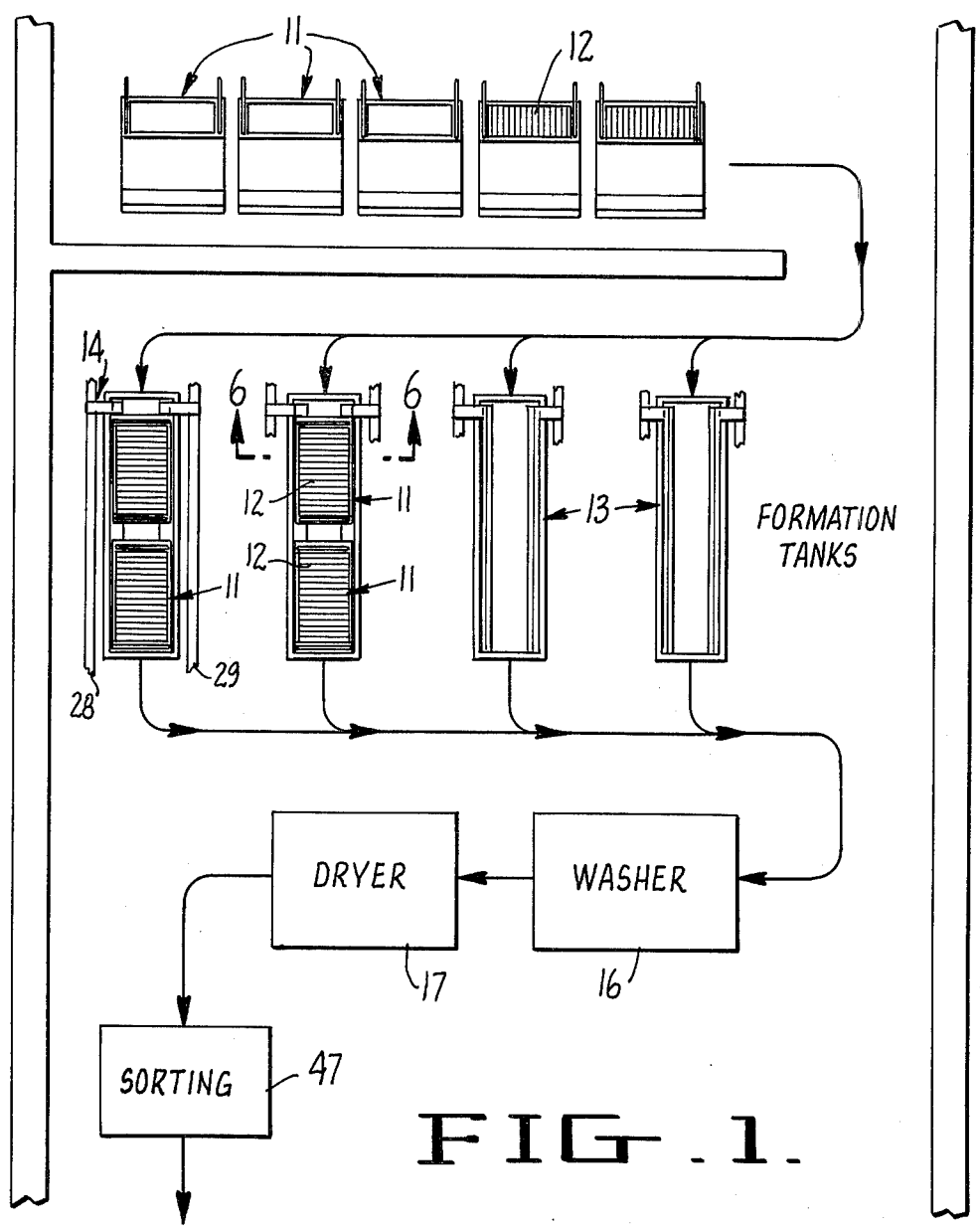
FIG. 1 is a schematic plan view of a system for treating battery plates in accordance with the present invention.

While only the preferred forms of the invention have been shown in the drawings and described specifically herein it will be apparent that changes and modifications could be made thereto within the ambit of the invention as defined in the claims.

DESCRIPTION OF THE PREFERRED EMBODIMENTS

Referring to the drawings in detail, it will be seen that the system for treating storage battery plates of the present invention as here shown provides a plurality of portable racks 11, each of which is adapted to contain a plurality of battery plates 12, one or more formation tanks 13 in which the racks and their battery plates are immersed in electrolyte, means 14 for applying electric current of opposite polarity to alternate plates in the rack, washing means 16 adapted to receive the racks 11 from the formation tanks 13 and to wash electrolyte from the surfaces of the racks and their plates, and drying means 17 for receiving the racks and their plates from the washer 16.

As may best be seen in FIGS. 3 and 4 of the drawings, the racks 11 are formed with a plurality of opposed vertical parallel slots 18 formed for receiving the opposite edges of the battery plates 12 to hold the plates in parallel spaced relation. The rack is provided with support means 19, here shown as a bar engageable by the lowermost portion of a battery plate positioned in the slots 18, for supporting the battery plate in the rack during transport. A pair of handles 21 are provided on the rack 11 for convenience in moving the rack from place to place.

Preferably, the racks 11 are tall enough so that a plate panel consisting of two of the battery plates 12 in bottom to bottom relation can be accommodated in each pair of slots 18. The lower plate in the slot is inverted so that its plate lug 22 depends from the plate, and the plate lugs 22 for all plates of corresponding polarity are positioned along one side of the rack. The plate lugs 23 for battery plates of opposite polarity are similarly aligned with each other at the opposite side of the rack. The upper plates 12 in each pair of slots are positioned with their plate lugs 22, 23 projecting upwardly and the upper and lower plates are in direct electrical contact.

A preferred manner of loading the racks 11 with their plates 12 is illustrated in FIG. 4 of the drawings. As there shown, a loading stand 24 is provided with angularly related portions 26 and 27 adapted to receive the support the racks 11 in an inclined position. The plates 12 are slid into the opposed slots 18 on the racks while the racks are supported in the loading stands 24.

Figure 6:
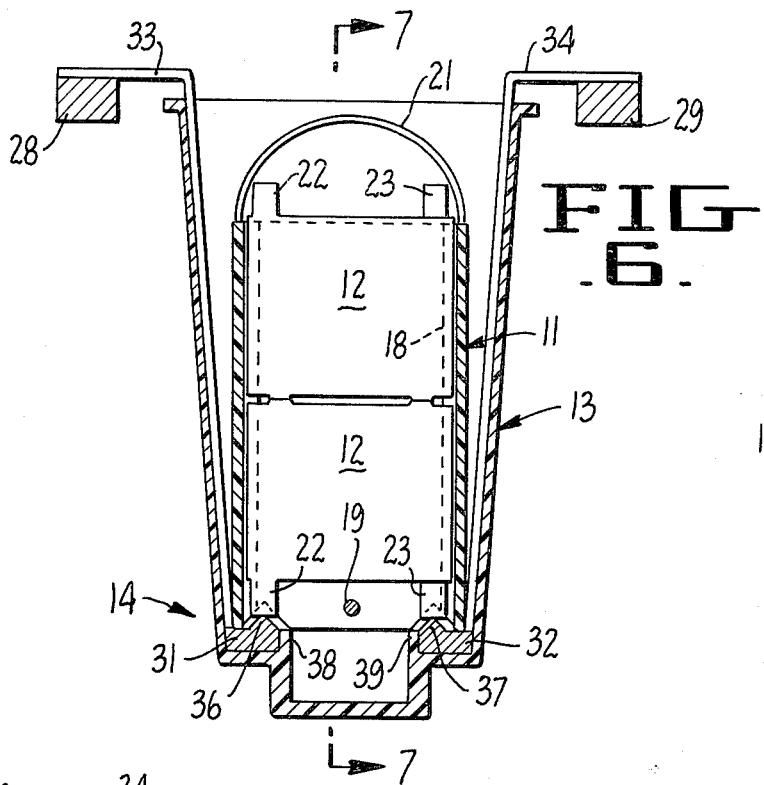
FIG. 6 is a vertical cross-sectional view on an enlarged scale taken substantially on the plane of line 6—6 of FIG. 1 and illustrating the rack structure positioned in a formation tank.
Figure 7:
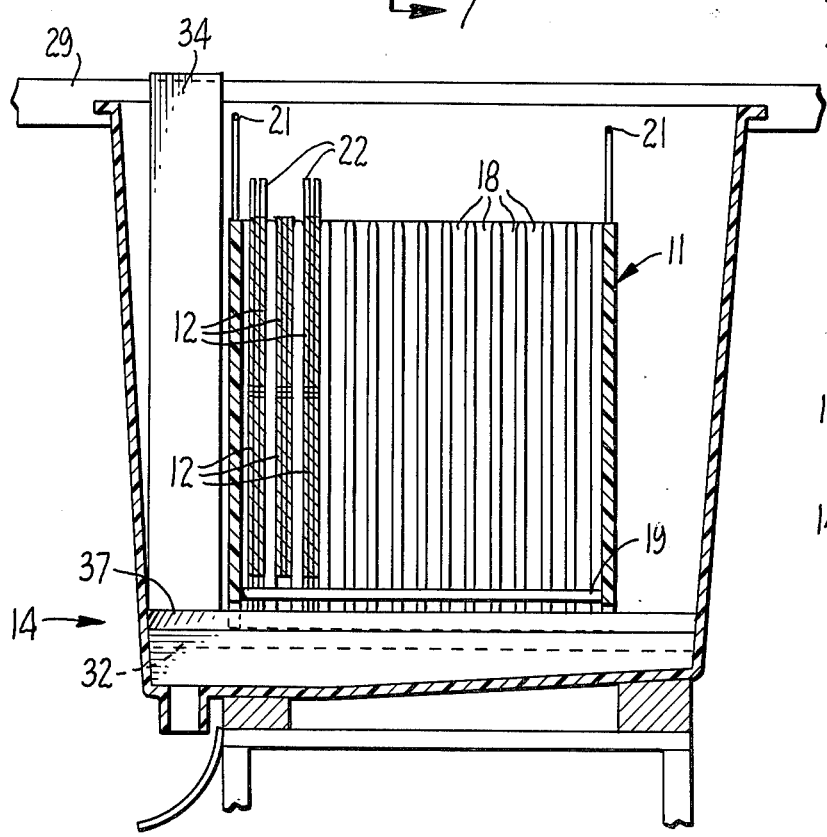
FIG. 7 is a vertical cross-sectional view taken substantially on the plane of line 7—7 of FIG. 6.

From the loading stands 24, the racks 11, with their plates 12, are transported to one or more formation tanks 13. As may be seen in FIGS. 6 and 7 of the drawings, the racks 11 are lowered into the tanks 13 in position for the plates 12 to be immersed in electrolyte contained in the formation tanks. The tanks 13 are formed of non-conductive, chemically resistant material such as fiberglass and preferably are tapered somewhat toward the bottom to facilitate positioning of the racks therein.

Figure 10:
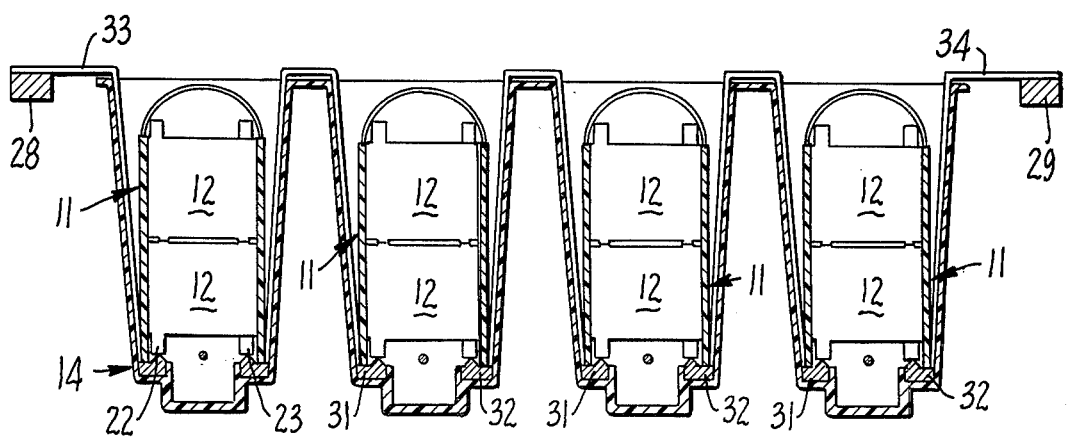
FIG. 10 is a vertical cross-sectional view through a plurality of side by side formation tanks electrically connected in series.

The tanks 13 may be positioned in any suitable arrangement permitting easy insertion and withdrawal of the loaded racks 11. Preferably, the racks are connected in series for efficient current utilization with economy of structure. FIG. 10 illustrates a side by side positioning of the formation tanks 13 with their contained racks electrically connected in series.

In accordance with the present invention, means 14 is provided for connecting the plate lugs 22 and 23 of alternate plates 12 to sources of electric current of opposite polarity, such as bus bars 28 and 29. In the form of the invention illustrated in FIG. 6, this is accomplished by metallic contact bars 31 and 32 mounted in the bottom of the formation tank 13 and connected by flat leads 33 and 34 to the bus bars 28 and 29.

As a feature of the invention, the plates 12 are slidable in the slots 18 and the supporting bar 19 is positioned so that the plate lugs 22 and 23 depend below the racks 11. When the latter is lowered into the formation tank 13, the plate lugs 22 and 23 rest upon the upper sides of the contact bars 31 and 32. The rack 11 drops on down so that the entire weight of the plates rests on the lugs 22 and 23, pressing the latter firmly against the contact bars 31 and 32 for facilitating good electric contact.

Figure 8:
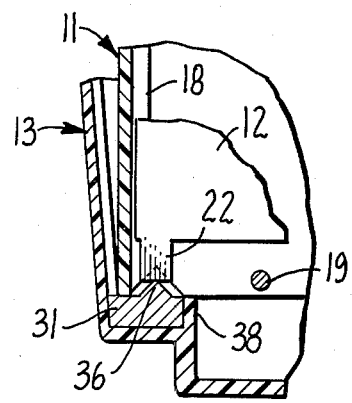
FIG. 8 is an enlarged fragmentary sectional view of a contact bar and plate lug structure for applying electrical current to battery plates.
Figure 9:
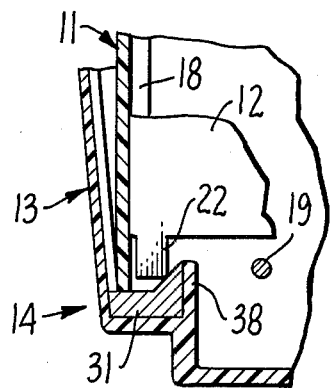
FIG. 9 is a view similar to FIG. 8, but showing a modified form of contact bar and plate lug structure.

The contact bars 31 and 32 are formed to promote the establishment of a good electrical contact with the plate lugs 22 and 23. As shown in FIG. 8, the upper edge of each contact bar is of inverted V-shaped to provide a longitudinal ridge 36, 37 upon which the plate lugs rest. In the version shown in FIG. 9, the upper edge is inclined for contact by the corner of the plate lug. This provides a wedging action of the plates 12 in slots 18 and a more effective electrical contact. The incline may be formed to intercept either corner of the plate lug. In both cases, the shape of the contact bars restricts the bearing area and affords a more intimate-to-metal contact.

The concept of the present invention of conveying the plates 12 through the various operations in the same rack also permits effecting electrical connection of the plates by means of conductor bars tacked onto the plate lugs in such manner that they can easily be broken off when the processing is completed.

Preferably, the formation tank is provided with flanges or baffles 38 and 39 of non-conductive, electrolyte resistance material which function to block and lengthen any potential current leakage path between the contact bars 31 and 32, so as to prevent electrical shorts.

In the form of the invention illustrated in FIG. 5 of the drawings, contact bars 42 and 43 are mounted in a modified version of the rack 40. Here too, the entire weight of the battery plates 12 contained within the rack rests on the contact bars 42 and 43 to assure good electrical contact. Contact bars 42 and 43 are provided with leads 44 and 46 for connecting the contact bars to the source of electric current of opposite polarity, such as bus bars 28 and 29.

After the plates 12 have been formed and charged, the racks and their plates are removed from the formation tanks and are transported through a suitable washer 16 capable of removing excess acid from the surfaces of the racks and the plates. From the washer 16, the racks and plates pass through dryer 17 before the racks are unloaded at a sorting station 47 and returned to the loading stands 24.

It should be apparent that the method and apparatus of the present invention area adapted for carrying out other processing steps on battery plates than those described above in the same expeditious manner. For example, the plates may be placed in the carrier racks immediately after pasting and the plates cured in the racks. Also, the racked plates can be solvent dried, or subjected to various preserving treatments with chemicals coatings, steam. Any or all of the various described processing and treating steps can be carried out with the plates mounted in the racks and afford the described safety and convenience features.

From the foregoing it will be seen that the system of the present invention provides a novel and effective method and apparatus for transporting large numbers of battery plates or plate panels in a safe and efficient manner through various treatment steps while eliminating problems arising from adverse working conditions and repetitive handling of the plates.

I claim:

1. In a system for processing storage battery plates, the method comprising
    inserting a plurality of positive battery plates in parallel spaced relation in a carrier rack with the plate lugs depending from said rack along one side thereof,
    positioning a plurality of negative battery plates in said carrier rack in alternating fashion between and in parallel spaced relation to said positive plates and with the plate lugs of said negative plates depending from said rack along the side thereof opposite said positive plate lugs,
    immersing said carrier rack and the battery plates supported therein in electrolyte,
    applying electric current of opposite polarity to the plate lugs depending from opposite sides of said carrier rack,
    removing said carrier rack and plates supported therein from said electrolyte,
    washing said carrier rack and plates supported therein to remove electrolyte from the surfaces thereof, and
    drying said carrier rack and plates supported therein.

2. The method as defined in claim 1 and wherein said carrier rack and plates supported therein are lowered into a formation tank having electrical contact bars therein in such manner that said depending plate lugs contact said contact bars with the full weight of said plates resting on said lugs for effecting a good electrical connection.

3. The method as defined in claim 1 and wherein said carrier rack is provided with parallel contact bars built therein for underlying and supporting said lugs and their associated plates, lowering said carrier rack and plates into a formation tank for immersion in an electrolyte, and effecting an electrical connection between said contact bars and a source of electric current of opposite polarity when said carrier rack is positioned in said formation tank.

4. Apparatus for treating battery plates, comprising
    a portable carrier rack having a plurality of opposed spaced parallel slots formed for slidably receiving the opposite edges of battery plates to be treated,
    support means on said carrier rack formed for supporting engagement with the lowermost portions of battery plates positioned in said slots,
    a formation tank formed to receive said carrier rack and plates supported therein for immersion in an electrolyte, and
    means for connecting alternate plates to sources of electric current of opposite polarity,
    said last named means comprising a pair of spaced parallel contact bars of electrically conductive and electrolyte resistant material having upper edges of inverted V-shaped to provide a sharp ridge,
    said carrier racks being proportioned to receive and support said plates with the plate lugs of the positive plates resting upon and pressing against said ridge on one of said contact bars and the plate lugs of the negative plates resting upon and pressing against said ridge on the other of said contact bars.

5. Apparatus as described in claim 4 and wherein said portable carrier rack is formed to permit the weight of the battery plates therein to rest upon said contact bars when said carrier rack is in said formation tank.

6. Apparatus as described in claim 5 and wherein said contact bars are mounted in said formation tank in position to intercept the depending lugs of said plates as said carrier rack and said plates are lowered into said formation tank.

7. Apparatus as described in claim 5 wherein said tank includes baffles of non-conductive material formed for impeding a current leakage path between said contact bars.

8. Apparatus as described in claim 5 and wherein said contact bars are incorporated into and form a part of said carrier rack.

9. Apparatus for treating battery plates, comprising
    a portable carrier rack having a plurality of opposed spaced parallel slots formed for slidably receiving the opposite edges of battery plates to be treated.
    support means on said carrier rack formed for supporting engagement with the lowermost portions of battery plates positioned in said slots,
    a formation tank formed to receive said carrier rack and plates supported therein for immersion in an electrolyte, and
    means for connecting alternate plates to source of electric current of opposite polarity,
    said carrier rack and said slots being deep enough to accommodate a plurality of battery plates in vertically aligned relation in each slot,
    the lower of said plates being inverted so that its plate lug depends therefrom and the upper of said plates having its plate lugs projecting upwardly with said plates being in metal-to-metal electrical contact,
    said means for connecting said alternate plates to source of electric current of opposite polarity comprising a pair of spaced parallel contact bars of electrically conductive and electrolyte resistant material,
    the upper edges of said contact bars being of inverted V-shape, and
    said carrier racks being proportional to receive and support said plates with the depending plate lugs of the positive plates resting upon and pressing against one of said contact bars and the depending plate lugs of the negative plates resting upon and pressing against the other of said contact bars.

10. Apparatus as described in claim 9 and wherein said portable carrier rack is formed to permit the weight of the battery plates therein to rest upon said contact bars when said carrier rack is in said formation tank.

11. Apparatus for treating dry-charge battery plates, comprising
- a plurality of portable carrier racks with each rack formed to receive and carry a plurality of battery plates in parallel spaced relation,
- a formation tank formed to receive said carrier racks,
- means for filling said formation tank with electrolyte,
- immersion means for dipping said carrier racks and the plates therein down into said electrolyte to immerse said plates,
- power means associated with said formation tank and adapted for supplying electric current of opposite polarity to alternate plates in said immersed carried racks,
- washer means formed to receive said carrier racks and plates therein lifted from said formation tank and to wash the electrolyte from the surface of such carrier rack and the battery plates contained therein, and
- means for drying said racks and their plates as they emerge from said washer.

12. A portable carrier rack structure for sequential treatment of a plurality of battery plates without removing the plates from the rack, comprising
- a generally rectangular frame of non-conductive and non-corrosive material having vertically extending sides,
- the inner faces of said sides being formed of a plurality of spaced vertically extending confronting grooves adapted for slidably receiving a plurality of battery plates in parallel spaced relation,
- support means extending along the lower portion of said frame in position to support batteries in said grooves, and
- handle means for transporting said carrier racks with plates therein to different places of treatment,
- said frame being open at its bottom and said battery plates being carried in said grooves with the plate lugs depending therefrom,
- alternate battery plates being of opposite polarity and the plate lugs depending in rows with the lugs of the same polarity in a row near one side of said frame and the lugs of opposite polarity in a row near the other side of said frame,
- said support means comprising a pair of electrically conductive contact bars formed to support said rows of lugs with one such bar to each row.

* * * * *